(12) United States Patent
Lee et al.

(10) Patent No.: US 11,940,460 B2
(45) Date of Patent: Mar. 26, 2024

(54) WHEEL SPEED SENSOR FOR VEHICLE (71) Applicant: HYUNDAI MOBIS CO., LTD., Seoul (KR)

(72) Inventors: Dong Geun Lee, Yongin-si (KR); Da Mi So, Yongin-si (KR); Ji Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/568,329

(22) Filed: Jan. 4, 2022

(65) Prior Publication Data

US 2023/0097071 A1 Mar. 30, 2023

(30) Foreign Application Priority Data

Sep. 27, 2021 (KR) .................. 10-2021-0127445

(51) Int. Cl.
*G01P 3/44* (2006.01)
(52) U.S. Cl.
CPC ..................... *G01P 3/44* (2013.01)
(58) Field of Classification Search
CPC ........................................ G01P 3/44
USPC ...................................... 73/514.39
See application file for complete search history.

(56) References Cited

U.S. PATENT DOCUMENTS

2021/0293280 A1 9/2021 Jeon et al.
2022/0268803 A1* 8/2022 Fontanesi ............... G01P 3/487

FOREIGN PATENT DOCUMENTS

| JP | 2021135260 A | 9/2021 | |
| KR | 10-2004-0009439 A | 1/2004 | |
| KR | 10-2020-0124116 A | 11/2020 | |
| WO | 2019224167 A2 | 11/2019 | |
| WO | 2020218860 A1 | 10/2020 | |
| WO | WO-2021145753 A1 * | 7/2021 | ......... B60B 27/0005 |

OTHER PUBLICATIONS

Office Action dated May 31, 2022 in the corresponding German Patent Application No. 102021133000.9.
Office Action dated Sep. 7, 2023 in the corresponding Korean Patent Application No. 10-2021-0127445.

* cited by examiner

*Primary Examiner* — Walter L Lindsay, Jr.
*Assistant Examiner* — Philip T Fadul
(74) *Attorney, Agent, or Firm* — NovoTechIP International PLLC (57) ABSTRACT

The present disclosure relates to a wheel speed sensor for a vehicle, the wheel speed sensor including: a base unit; a plurality of support units positioned on the base unit; and chip units respectively mounted on the support units and configured to detect a measurement target.

9 Claims, 12 Drawing Sheets

WHEEL SPEED SENSOR FOR VEHICLE

CROSS-REFERENCE TO RELATED APPLICATION

This application claims priority from and the benefit of Korean Patent Application No. 10-2021-0127445, filed on Sep. 27, 2021, which is hereby incorporated by reference for all purposes as if set forth herein.

BACKGROUND

Field

The present disclosure relates to a wheel speed sensor for a vehicle, and more particularly, to a wheel speed sensor for a vehicle that may have a plurality of different sensor arrangement positions, thereby facilitating a process of detecting noise factors and performing correction.

Discussion of the Background

In general, a main brake refers to a device for reducing a speed of a vehicle while the vehicle travels and keeping the vehicle stopped. A friction brake has been used as the main brake used for the vehicle. The friction brake uses a mechanical friction device that converts kinetic energy of the traveling vehicle into thermal energy, and the friction brake brakes the vehicle while releasing frictional heat into the air.

Among the brakes for a vehicle, a device, which is commonly called an anti-lock braking system (ABS), ensures maneuverability by controlling a hydraulic braking pressure when rapidly braking a vehicle or braking a vehicle traveling on a slippery road surface, and improves braking performance by minimizing a stopping distance. The ABS broadly includes: a hydraulic modulator (Hydraulic unit) for controlling a hydraulic pressure supplied to a wheel cylinder depending on a signal from an ECU for controlling the ABS, and a device for detecting a state of rotation of the wheel.

In this case, the device for detecting a state of rotation of the wheel is generally called a wheel speed sensor (WSS). The wheel speed sensor refers to a sensor that detects a speed of each of the wheels using a Hall IC chip. The wheel speed sensor not only is an important factor of the ABS/ESP (electronic stability program, a vehicle posture control device), but also provides important information associated with control of other vehicle components.

Recently, two or more Hall IC chips are disposed in a single housing to improve measurement accuracy. However, the plurality of Hall IC chips has the same performance and are positioned at the same upper end of a magnetic element that is a measurement target. Therefore, when the wheel rotates, the respective Hall IC chips acquire the same measured value, and a control unit compares the respective signals and ensures consistency. For this reason, when all the signals are distorted by external disturbances, there is a problem in that accurate signal information cannot be provided. Therefore, there is a need to solve the problem.

The background technology of the present disclosure is disclosed in Korean Patent Application Laid-Open No. 2004-0009439 (published on Jan. 31, 2004 and entitled 'Method of Detecting Speed of Vehicle Using Speed Sensor'.

SUMMARY

An object of the present disclosure is to provide a wheel speed sensor for a vehicle that may be disposed at a plurality of different sensor arrangement positions, thereby facilitating a process of detecting noise factors and performing correction.

Various embodiments are directed to a wheel speed sensor for a vehicle, including: a base unit; a plurality of support units provided on the base unit; and chip units respectively mounted on the support units and configured to detect a measurement target, in which the respective chip units are disposed to detect different detection values in respect to the measurement target.

The chip units may be disposed at different measurement points by changing shapes or positions of the support units.

The base unit and the support units may be integrated by injection molding.

The support units may include: a first support unit integrated with the base unit and configured such that a first chip unit is mounted thereon; and a second support unit integrated with the base unit and configured such that a second chip unit is mounted thereon.

The first chip unit and the second chip unit may have a positional difference in one or more of an x-axis direction, a y-axis direction, and a z-axis direction.

The support units may be assembled to the base unit.

The support units may include: a first support unit attachable to or detachable from the base unit and configured such that a first chip unit is mounted thereon; and a second support unit attachable to or detachable from the base unit and configured such that a second chip unit is mounted thereon.

The first chip unit and the second chip unit may have a positional difference in one or more of an x-axis direction, a y-axis direction, and a z-axis direction by a difference in shape or assembly position between the first support unit and the second support unit.

The support units may further include a third support unit coupled to one or both of the first support unit and the second support unit and attachable to or detachable from the base unit.

The first support unit and the second support unit may have the same shape, and the first chip unit and the second chip unit may have a positional difference in one or more of an x-axis direction, a y-axis direction, and a z-axis direction by the third support unit.

According to the wheel speed sensor for a vehicle according to the present disclosure, the chip units, which are respectively mounted on the support units provided on the base unit, may measure the measurement target under different conditions depending on the shapes and positions of the support units. Therefore, the wheel speed sensor may determine the external disturbance under different conditions, thereby quickly detecting the external disturbance and performing the correction.

DETAILED DESCRIPTION OF THE ILLUSTRATED EMBODIMENTS

Hereinafter, a wheel speed sensor for a vehicle will be described below with reference to the accompanying drawings through various exemplary embodiments.

Hereinafter, embodiments of a wheel speed sensor for a vehicle according to the present disclosure will be described with reference to the accompanying drawings. Here, thicknesses of lines illustrated in the drawings, sizes of constituent elements, or the like may be exaggerated for clarity and convenience of description. In addition, the terms used below are defined in consideration of the functions in the present disclosure and may vary depending on the intention of a user or an operator or a usual practice. Therefore, the definition of the terms should be made based on the entire contents of the present specification.

Figure 1:
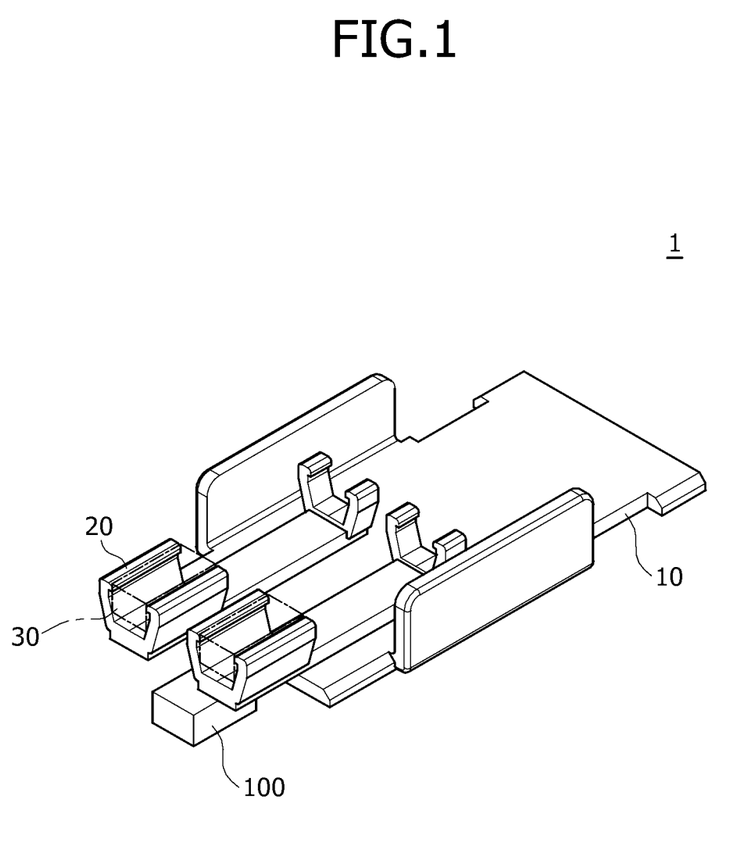
FIG. 1 is a view schematically illustrating a wheel speed sensor for a vehicle according to an embodiment of the present disclosure.

FIG. 1 is a view schematically illustrating a wheel speed sensor for a vehicle according to an embodiment of the present disclosure. Referring to FIG. 1, a wheel speed sensor 1 for a vehicle according to an embodiment of the present disclosure includes a base unit 10, support units 20, and chip units 30.

The base unit 10 may be fixedly mounted on a vehicle body and positioned adjacent to a measurement target 100.

The plurality of support units 20 is positioned on the base unit 10. For example, the pair of support units 20 may be positioned on an upper surface of the base unit 10.

The chip units 30 are respectively mounted on the support units 20 and detect the measurement target 100. For example, the chip unit 30 may be fitted with the support unit 20 and integrated with the support unit 20 by injection molding. The chip unit 30 may detect a magnetic field of the measurement target 100 and transmit a detection signal to a control unit.

In this case, the respective chip units 30 are positioned to detect different detection values with respect to the measurement target 100. For example, the respective chip units 30 reach measurable positions as the measurement target 100 rotates. The respective chip units 30 have different heights, different depths, different mounting directions, and different angles, such that a method of processing and calculating signals may be dualized depending on components of the magnetic field. Therefore, it is possible to improve precision in accordance with a change in magnetic field and a usage region. In particular, vertical and horizontal decomposition values of the components of the magnetic field vary depending on the positions and directions of the chip units 30. Therefore, it is possible to quickly determine whether an external disturbance occurs, perform correction, and transmit accurate signals at normal times.

The measurement method of the chip unit 30 varies depending on the intensity of the magnetic field that varies depending on physical properties and distances of the measurement target 100. When the measurement target 100 is feebly-magnetic, a difference between signals measured by the chip units 30 internally positioned at a plurality of positions is used. In contrast, when the measurement target 100 is ferromagnetic, a single signal is measured at a predetermined position. However, when the measured value varies depending on the positions of the chip units 30, the noise factor may be detected, and the correction may be performed.

In this case, the chip units 30 are positioned at different measurement points due to varying shapes or positions of the support units 20.

Figure 2:
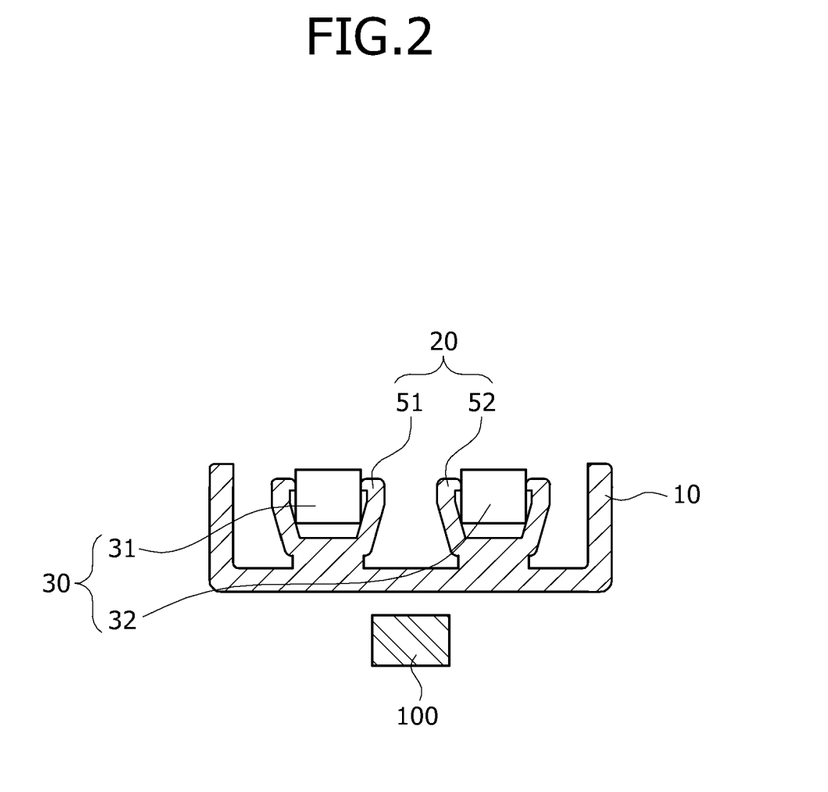
FIG. 2 is a view schematically illustrating a state in which a base unit and support units according to a first embodiment of the present disclosure are integrated by injection molding.
Figure 3:
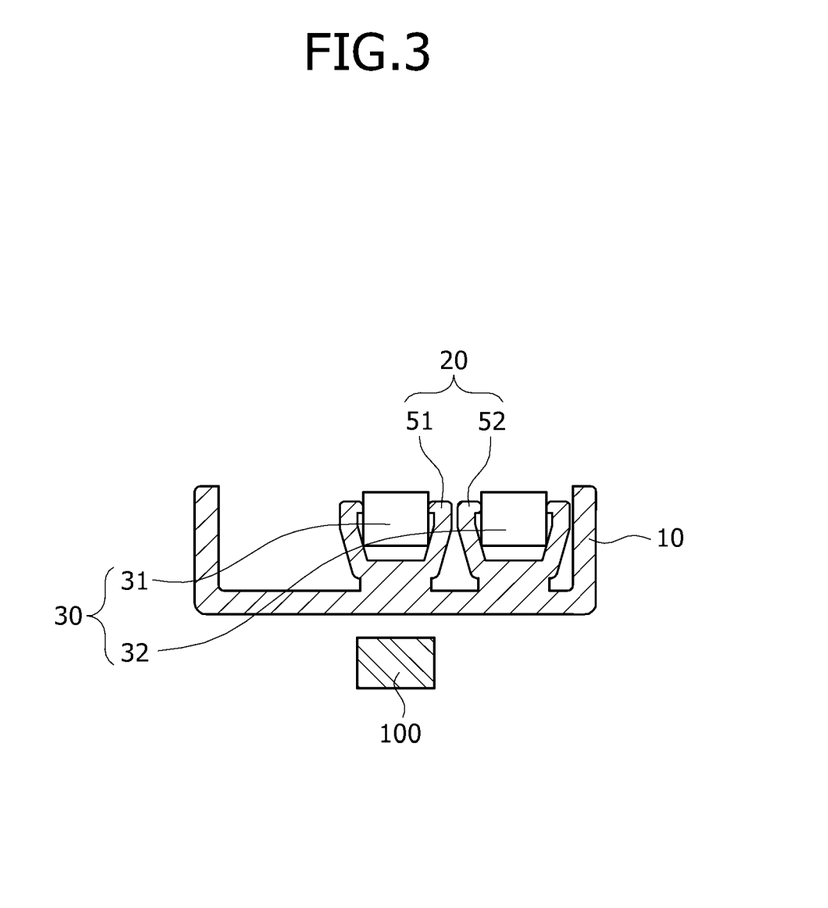
FIG. 3 is a view schematically illustrating the support units that allow a first chip unit and a second chip unit according to the first embodiment of the present disclosure to have a positional difference in an x-axis direction.
Figure 4:
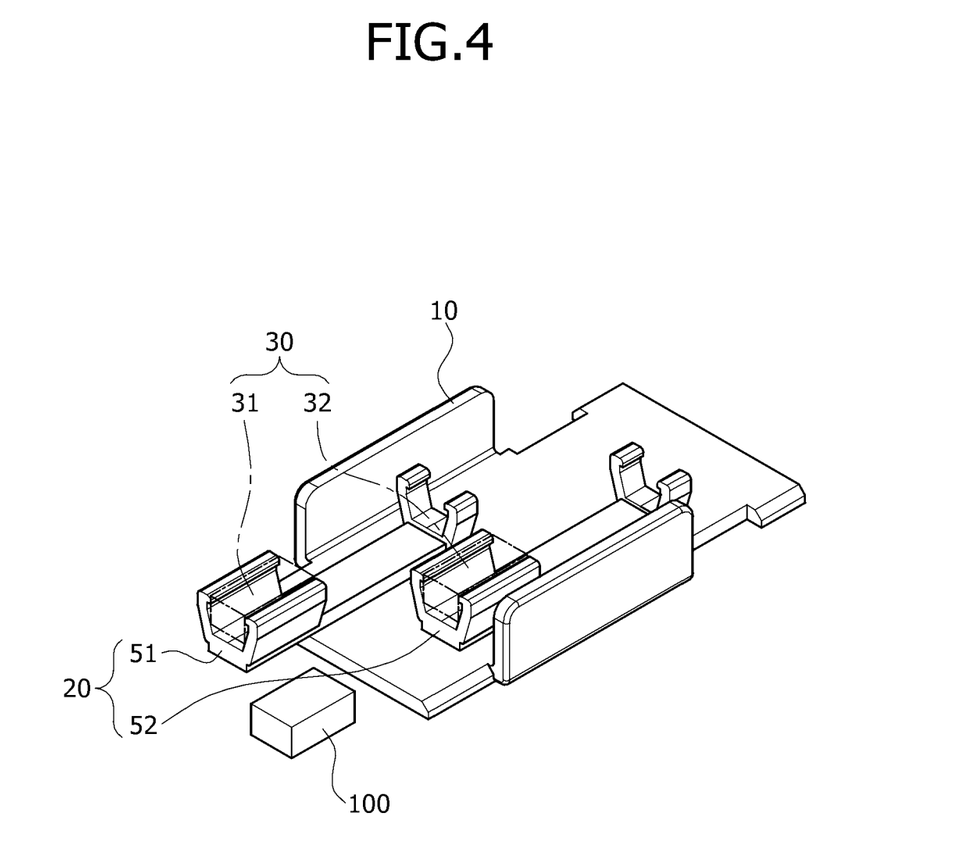
FIG. 4 is a view schematically illustrating the support units that allow the first chip unit and the second chip unit according to the first embodiment of the present disclosure to have a positional difference in a y-axis direction.
Figure 5:
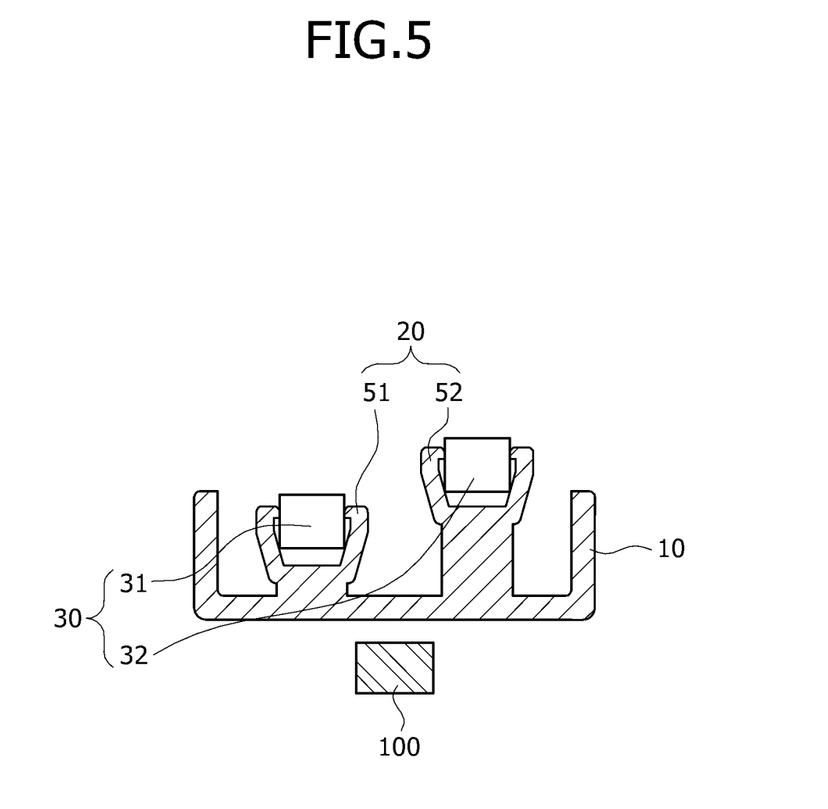
FIG. 5 is a view schematically illustrating the support units that allow the first chip unit and the second chip unit according to the first embodiment of the present disclosure to have a positional difference in a z-axis direction.
Figure 6:
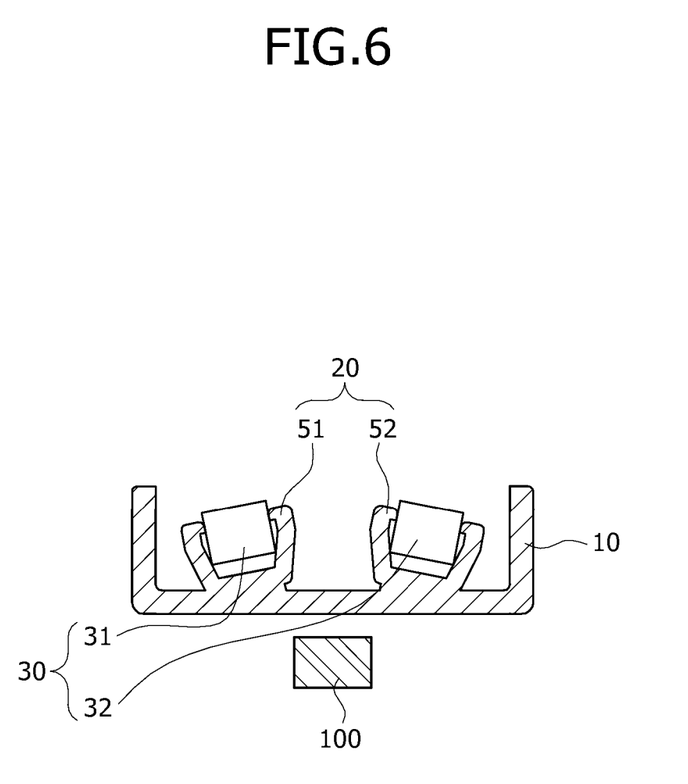
FIG. 6 is a view schematically illustrating the support units that allow the first chip unit and the second chip unit according to the first embodiment of the present disclosure to measure magnetic field information in an opposite manner.

FIG. 2 is a view schematically illustrating a state in which the base unit and the support units according to the first embodiment of the present disclosure are integrated by injection molding, and FIG. 3 is a view schematically illustrating the support units that allow the first chip unit and the second chip unit according to the first embodiment of the present disclosure to have a positional difference in an x-axis direction. FIG. 4 is a view schematically illustrating the support units that allow the first chip unit and the second chip unit according to the first embodiment of the present disclosure to have a positional difference in a y-axis direction. FIG. 5 is a view schematically illustrating the support units that allow the first chip unit and the second chip unit according to the first embodiment of the present disclosure to have a positional difference in a z-axis direction. FIG. 6 is a view schematically illustrating the support units that allow the first chip unit and the second chip unit according to the first embodiment of the present disclosure to measure magnetic field information in an opposite manner. The structure in which the base unit 10 and the support units 20 are integrated by injection molding will be described below with reference to FIGS. 2 to 6.

The base unit 10 and the support units 20 are integrally manufactured by injection molding in a mold. In this case, when the chip units 30 are inputted into the mold, the chip units 30 may be supported by the support units 20 during the molding process, and the chip units 30 and the support units 20 may be integrated so as to be covered by the base unit 10.

The support units 20 according to the first embodiment includes a first support unit 51 and a second support unit 52. The first support unit 51 is integrated with the base unit 10, and a first chip unit 31 is mounted on the first support unit 51. The second support unit 52 is integrated with the base unit 10, and a second chip unit 32 is mounted on the second support unit 52.

Because the first support unit 51 and the second support unit 52 have different shapes or positions, the first chip unit 31 and the second chip unit 32 have a positional difference in one or more of the x-axis direction, the y-axis direction, and the z-axis direction.

More specifically, the first support unit 51 and the first chip unit 31 are positioned on a central portion of the base unit 10, and the second support unit 52 and the second chip unit 32 are positioned between the first support unit 51 and the right end of the base unit 10 (see FIG. 3). With the positional difference in the x-axis direction, the signal magnitude or the calculation method may be dualized by detecting the intensity of the magnetic field from the measurement target 100.

Further, the first support unit 51 and the first chip unit 31 are positioned at a front side of the base unit 10, and the second support unit 52 and the second chip unit 32 are positioned at a rear side of the base unit 10 (see FIG. 4). With the positional difference in the y-axis direction, the signal magnitude or the calculation method may be dualized by detecting the intensity of the magnetic field from the measurement target 100.

In addition, the second support unit 52 has a longer vertical length than the first support unit 51, and the second chip unit 32 is positioned higher than the first chip unit 31 (see FIG. 5). With the positional difference in the z-axis direction, the signal magnitude or the calculation method may be dualized by detecting the intensity of the magnetic field from the measurement target 100.

Further, the first support unit 51 has an inclination angle in the counterclockwise direction, and the second support unit 52 has an inclination angle in the clockwise direction, such that the first chip unit 31 and the second chip unit 32 are positioned to have inclinations in opposite directions (see FIG. 6). In this case, the components in the y-axis direction and the components in the z-axis direction may be decomposed. The vertical and horizontal components for the first and second chip units 31 and 32 may be detected, and the external noise factors may be detected from the decomposition signal in the other direction.

Figure 7:
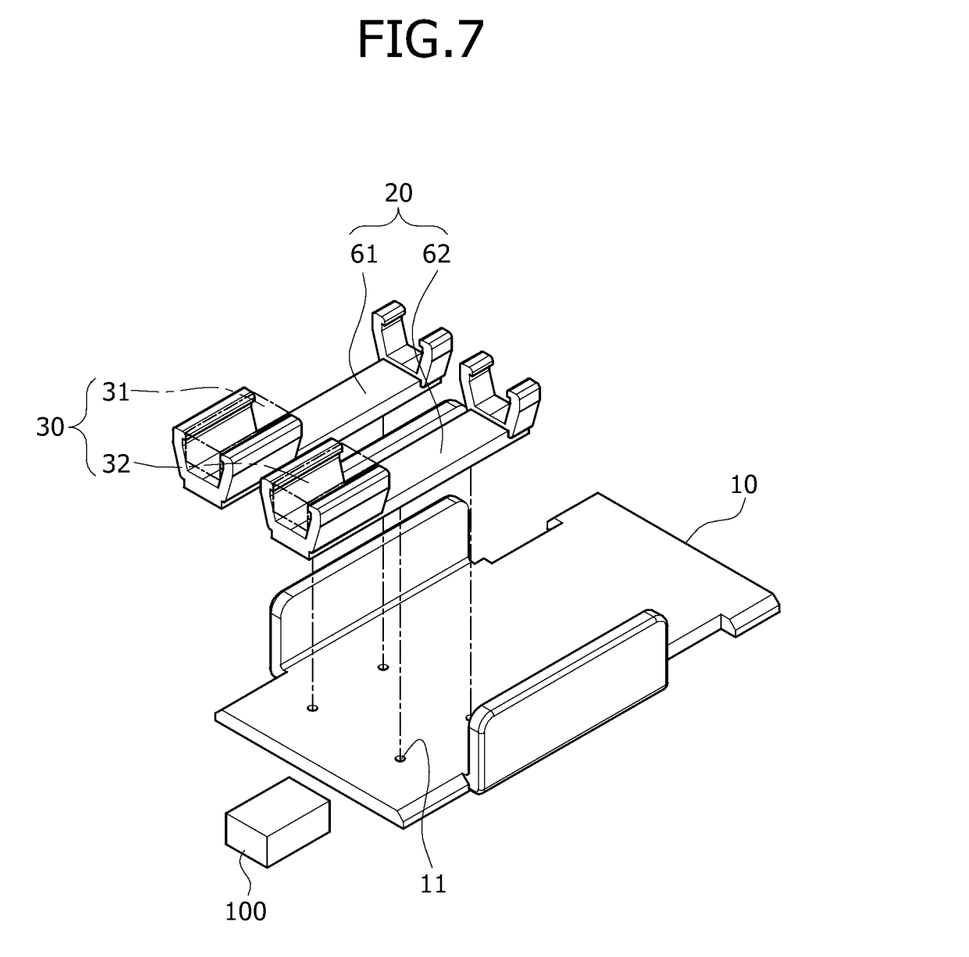
FIG. 7 is a view schematically illustrating a state in which a base unit and support units according to a second embodiment of the present disclosure are assembled.
Figure 8:
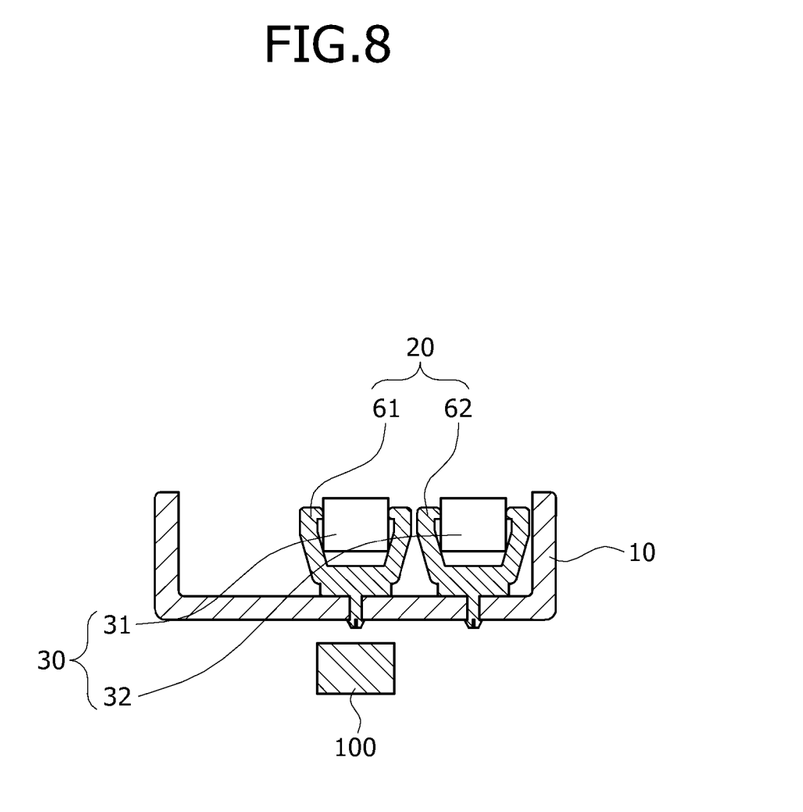
FIG. 8 is a view schematically illustrating the support units that allow a first chip unit and a second chip unit according to the second embodiment of the present disclosure to have a positional difference in the x-axis direction.
Figure 9:
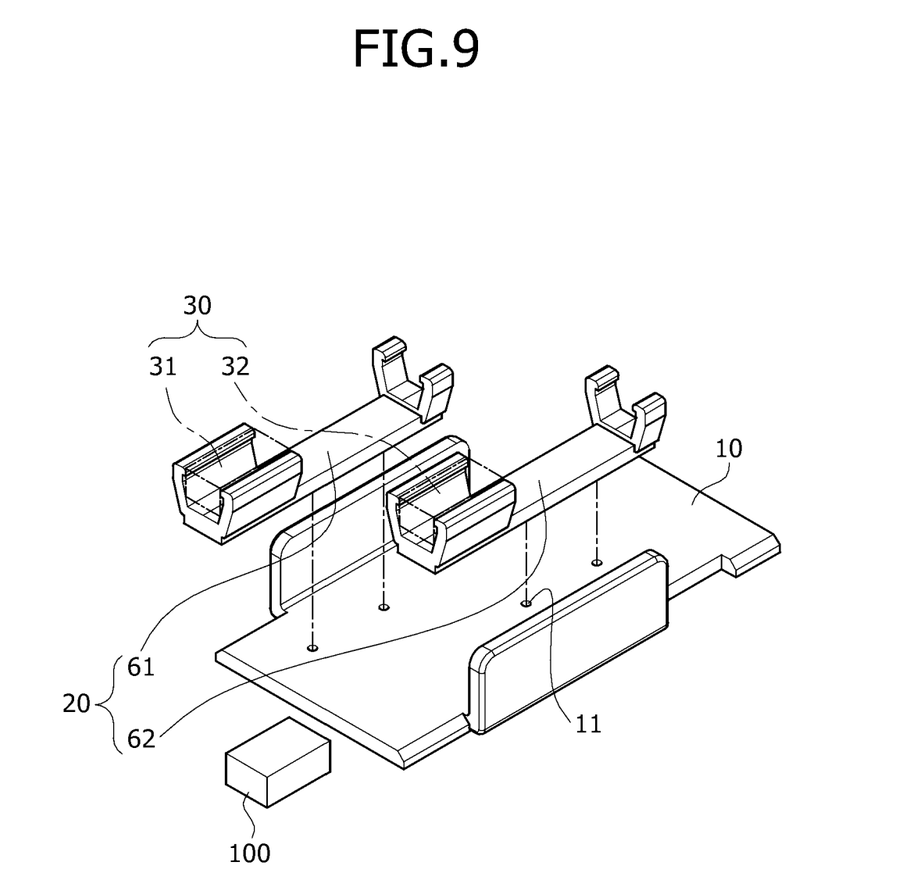
FIG. 9 is a view schematically illustrating the support units that allow the first chip unit and the second chip unit according to the second embodiment of the present disclosure to have a positional difference in the y-axis direction.
Figure 10:
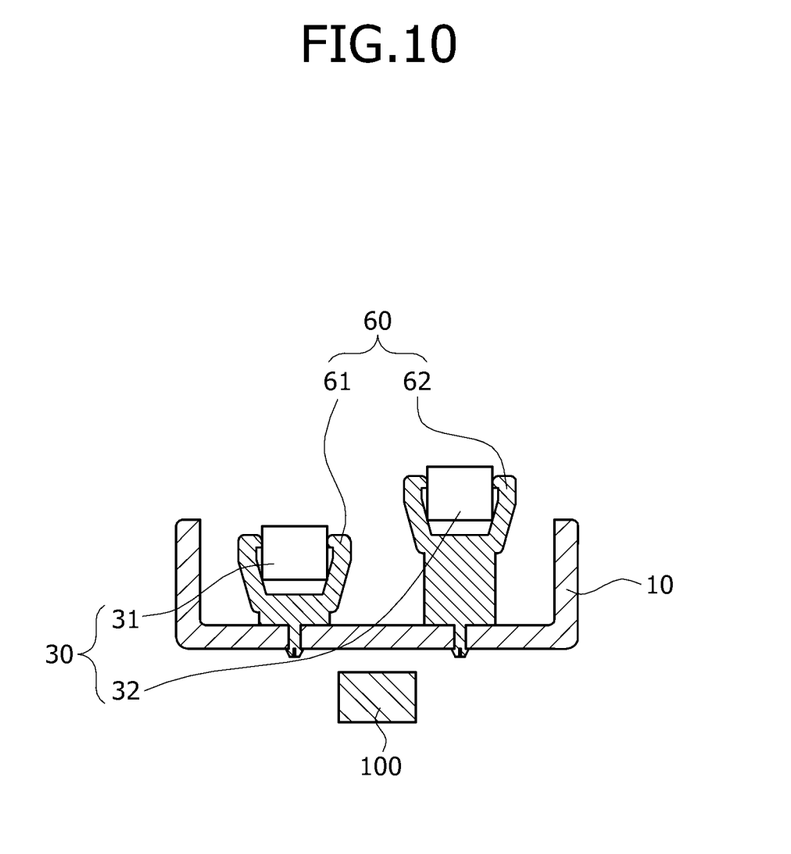
FIG. 10 is a view schematically illustrating stationary support units that allow the first chip unit and the second chip unit according to the second embodiment of the present disclosure to have a positional difference in the z-axis direction.
Figure 11:
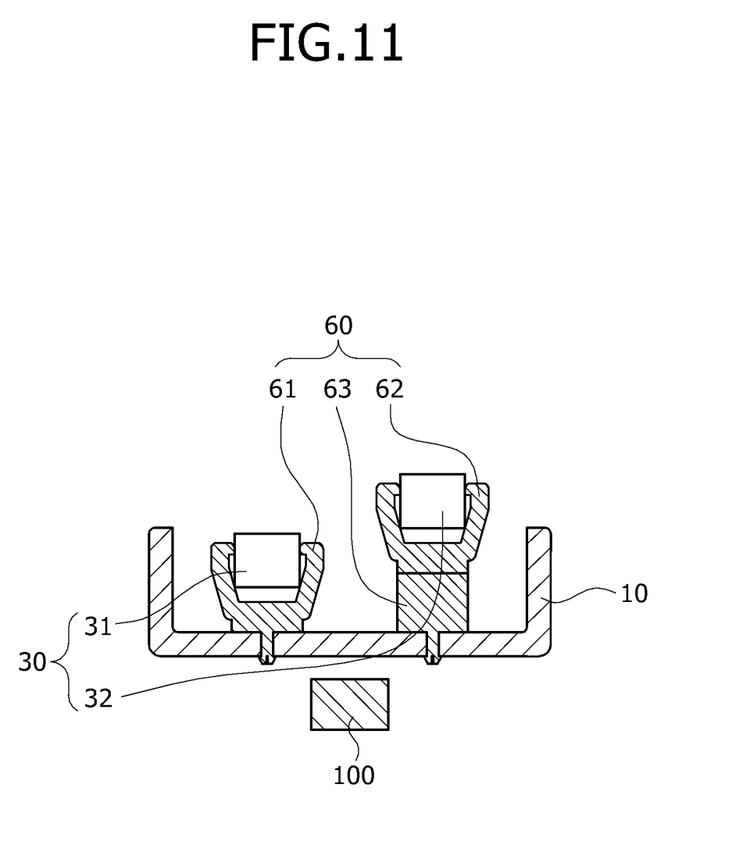
FIG. 11 is a view schematically illustrating variable support units that allow the first chip unit and the second chip unit according to the second embodiment of the present disclosure to have a positional difference in the z-axis direction.
Figure 12:
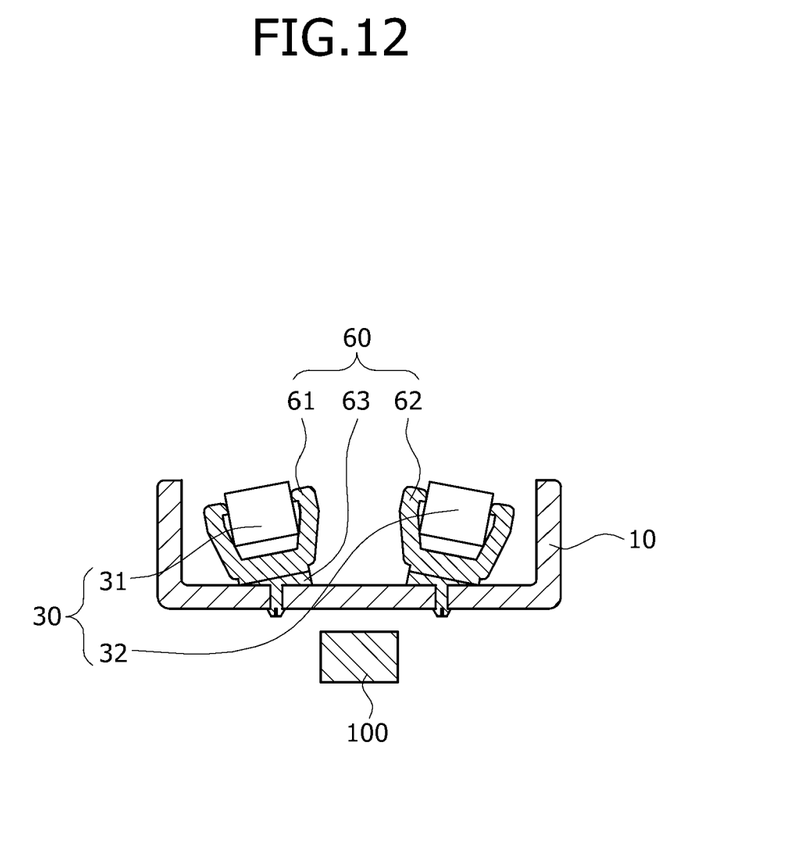
FIG. 12 is a view schematically illustrating the support units that allow the first chip unit and the second chip unit according to the second embodiment of the present disclosure to measure magnetic field information in an opposite manner.

FIG. 7 is a view schematically illustrating a state in which a base unit and support units according to a second embodiment of the present disclosure are assembled. FIG. 8 is a view schematically illustrating the support units that allow a first chip unit and a second chip unit according to the second embodiment of the present disclosure to have a positional difference in the x-axis direction. FIG. 9 is a view schematically illustrating the support units that allow the first chip unit and the second chip unit according to the second embodiment of the present disclosure to have a positional difference in the y-axis direction. FIG. 10 is a view schematically illustrating stationary support units that allow the first chip unit and the second chip unit according to the second embodiment of the present disclosure to have a positional difference in the z-axis direction, FIG. 11 is a view schematically illustrating variable support units that allow the first chip unit and the second chip unit according to the second embodiment of the present disclosure to have a positional difference in the z-axis direction, and FIG. 12 is a view schematically illustrating the support units that allow the first chip unit and the second chip unit according to the second embodiment of the present disclosure to measure magnetic field information in an opposite manner. A structure in which the base unit 10 and the support units 20 are assembled will be described below with reference to FIGS. 7 to 12.

The base unit 10 has base hole portions 11 for assembly, and the support units 20 may be attached to or detached from the base unit 10 through the base hole portions 11 formed in the base unit 10. The support unit 20 may be assembled to the base unit 10 by a hook, and the chip unit 30 may be mounted on the support unit 20.

The support units 20 according to the second embodiment includes a first support unit 61 and a second support unit 62. A hook is provided on a bottom surface of the first support unit 61 so as to be attached to or detached from the base unit 10, and the first chip unit 31 is mounted on an upper portion of the first support unit 61. A hook is provided on a bottom surface of the second support unit 62 so as to be attached to or detached from the base unit 10, and the second chip unit 32 is mounted on an upper portion of the second support unit 62.

Because the first support unit 61 and the second support unit 62 are assembled to have different shapes or positions, the first chip unit 31 and the second chip unit 32 have a positional difference in one or more of the x-axis direction, the y-axis direction, and the z-axis direction.

In addition, the first support unit 61 and the second support unit 62 may have the same shape, and a third support unit 63 coupled to one or both of the first support unit 61 and the second support unit 62 may be attached to or detached from the base unit 10.

More specifically, the first support unit 61 on which the first chip unit 31 is mounted is assembled to a central portion of the base unit 10, and the second support unit 62 on which the second chip unit 32 is mounted is assembled between the first support unit 61 and the right end of the base unit 10 (see FIG. 8). With the positional difference in the x-axis direction, the signal magnitude or the calculation method may be dualized by detecting the intensity of the magnetic field from the measurement target 100. In this arrangement structure, the first support unit 61 and the second support unit 62 may have the same shape. Further, since the first support unit 61 and the second support unit 62 are selectively assembled to the plurality of base hole portions 11 formed in the base unit 10, a positional difference may occur between the first chip unit 31 and the second chip unit 32.

Further, the first support unit 61 on which the first chip unit 31 is mounted is assembled at a front side of the base unit 10, and the second support unit 62 on which the second chip unit 32 is mounted is assembled at a rear side of the base unit 10 (see FIG. 9). With the positional difference in the y-axis direction, the signal magnitude or the calculation method may be dualized by detecting the intensity of the magnetic field from the measurement target 100. In this arrangement structure, the first support unit 61 and the second support unit 62 may have the same shape. Further, since the first support unit 61 and the second support unit 62 are selectively assembled to the plurality of base hole portions 11 formed in the base unit 10, a positional difference may occur between the first chip unit 31 and the second chip unit 32.

In addition, since the second support unit 62 is molded to have a longer vertical length than the first support unit 61 having a fixed shape, the second chip unit 32 is positioned higher than the first chip unit 31 (see FIG. 10). With the positional difference in the z-axis direction, the signal magnitude or the calculation method may be dualized by detecting the intensity of the magnetic field from the measurement target 100. In this arrangement structure, when the first support unit 61 and the second support unit 62 have the same shape, the third support unit 63 may be additionally mounted on the second support unit 62 to adjust the height (see FIG. 11). The third support unit 63 may engage with the second support unit 62 by means of a hook and engage with the base unit 10 by means of a hook. The plurality of third support units 63 may be manufactured to have various heights or the same shape and stacked.

Further, the first support unit 61 having an inclination angle in the counterclockwise direction, and the second support unit 62 having an inclination angle in the clockwise direction, are assembled to the base unit 10, such that the first chip unit 31 and the second chip unit 32 are positioned to have inclinations in opposite directions (see FIG. 12). In this case, the components in the y-axis direction and the components in the z-axis direction may be decomposed. The vertical and horizontal components for the first and second chip units 31 and 32 may be detected, and the external noise factors may be detected from the decomposition signal in the other direction. In this arrangement structure, when the first support unit 61 and the second support unit 62 have the same shape, the third support unit 63 may be additionally mounted on one or both of the first support unit 61 and the second support unit 62 to adjust the inclination. The third support units 63 may have different inclination angles and engage with the first support unit 61 and the second support unit 62 by hooks and engage with the base unit 10 by hooks.

According to the wheel speed sensor 1 for a vehicle according to the embodiment of the present disclosure, the chip units 30, which are respectively mounted on the support units 20 provided on the base unit 10, may measure the measurement target 100 under different conditions depending on the shapes and positions of the support units 20. Therefore, the wheel speed sensor 1 may determine the external disturbance under different conditions, thereby quickly detecting the external disturbance and performing the correction.

While the present disclosure has been described with reference to the exemplary embodiment depicted in the drawings, the exemplary embodiment is described just for illustration, and those skilled in the art will understand that various modifications of the exemplary embodiment and any other exemplary embodiment equivalent thereto are available. Accordingly, the true technical protection scope of the present disclosure should be determined by the appended claims.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A wheel speed sensor for a vehicle, comprising:
a base unit having upper and lower surfaces respectively facing in different directions;
a plurality of chip units disposed over the upper surface of the base, each chip unit configured to measure a magnetic field component of a measurement target moving below the lower surface of the base unit; and
a plurality of support units protruding upwardly from the upper surface of the base unit and respectively configured to hold the plurality of chip units at elevated positions from the upper surface of the base unit,
wherein each chip unit has a different height, different depth, different mounting direction or different angle with respect to the measurement target such that the magnetic field component of the measurement target measured by each chip unit has a different value.

2. The wheel speed sensor of claim 1, wherein the base unit and the support units are integrally formed.

3. The wheel speed sensor of claim 2, wherein:
the plurality of support units comprises first and second support units integrated with the base unit, and
the plurality of chip units comprises:
a first chip unit positioned on the first support unit; and
a second chip unit positioned on the second support unit.

4. The wheel speed sensor of claim 3, wherein the first and second chip units have a positional difference in at least one of x-axis, y-axis, and z-axis directions.

5. The wheel speed sensor of claim 1, wherein the support units and the base unit are assembled together.

6. The wheel speed sensor of claim 5, wherein:
the plurality of support units comprises first and second support units configured to be attachable to and detachable from the base unit, and
the plurality of chip units comprises:
a first chip unit positioned on the first support unit; and
a second chip unit positioned on the second support unit.

7. The wheel speed sensor of claim 6, wherein the first and second chip units have a positional difference in at least one of x-axis, y-axis and z-axis directions, which is caused by a difference in shape or assembly position between the first and second support units.

8. The wheel speed sensor of claim 6, wherein the plurality of support units further comprises a third support unit coupled to one of or both the first and second support units and configured to be attachable to and detachable from the base unit.

9. The wheel speed sensor of claim 8, wherein:
the first and second support units have the same shape, and
the first and second chip units have a positional difference in at least one of x-axis, y-axis, and z-axis directions caused by the third support unit.

* * * * *